W. DYSERT.
Cultivator.
No. 4,725. Patented Aug. 28, 1846.
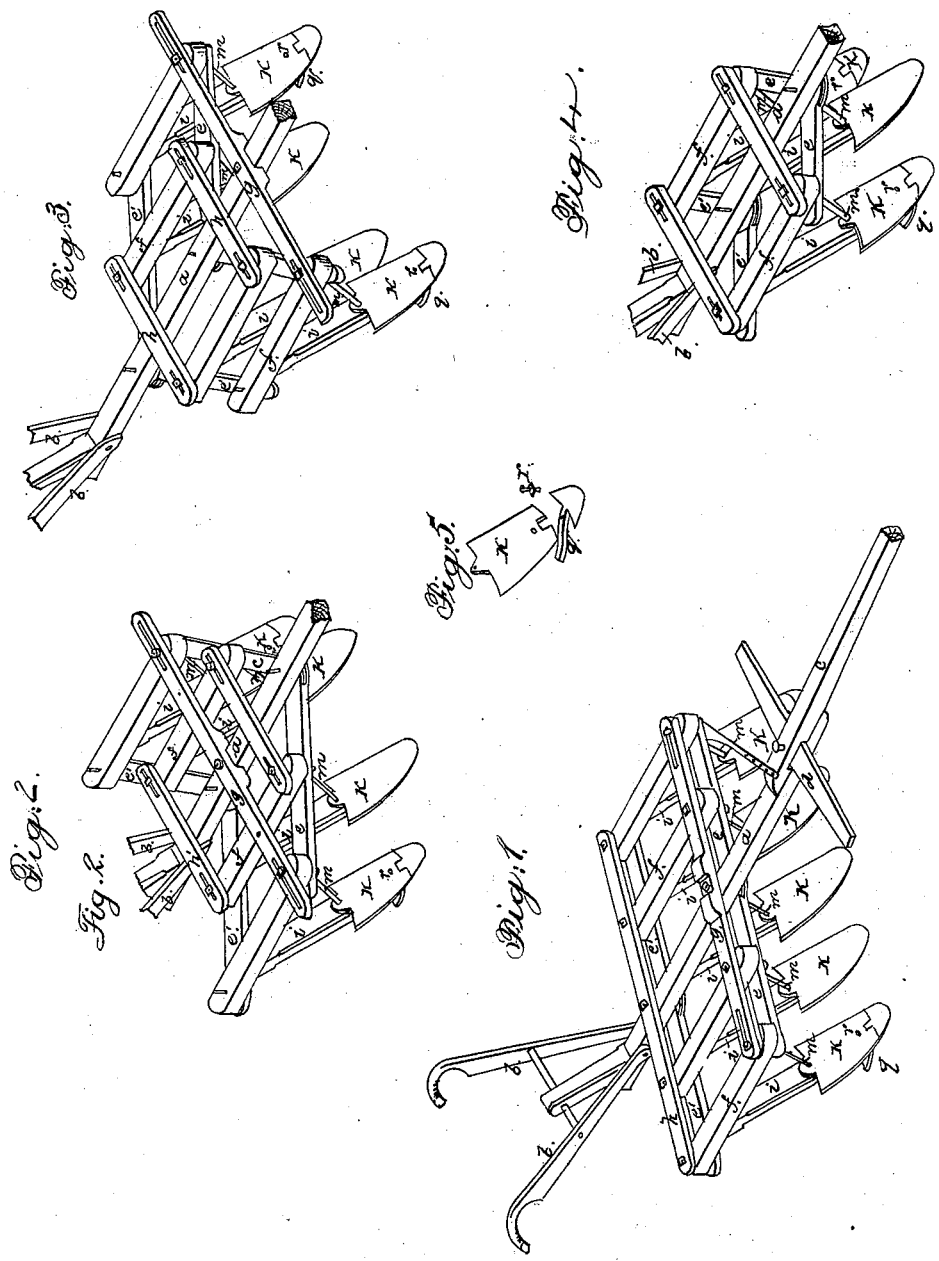

UNITED STATES PATENT OFFICE.

WILLIAM DYSERT, OF GETTYSBURG, PENNSYLVANIA.

IMPROVEMENT IN CULTIVATORS.

Specification forming part of Letters Patent No. 4,725, dated August 28, 1846.

*To all whom it may concern:*

Be it known that I, WILLIAM DYSERT, of Gettysburg, in the county of Adams, in the State of Pennsylvania, have invented a new and useful Improvement in Cultivators, which I denominate the "Universally Adjustable Cultivator;" and I do hereby declare that the following is a full, clear, and exact description of the principle or character which distinguishes it from all other things before known, and of the manner of making, constructing, and using the same, reference being had to the accompanying drawings, making part of this specification, in which—

Figure 1 is the apparatus in position for seeding, having five shovels; Fig. 2, the same placed in position for corn or cotton cultivation; Fig. 3, the same for cultivating between rows. Fig. 4 is a cultivator with three shovels for one horse.

The same letters indicate like parts in all the figures.

In the ordinary implements for cultivating no adjustments can be made, and consequently they can each be used but for a single purpose. Several attempts have been made to render the same implement useful for a variety of work, with more or less success, one of which I patented in 1844; but the trouble required in shifting the parts rendered it somewhat inconvenient and it could not be adapted to all contingencies.

In my present improvement an implement is found of universal application, and one which is readily changed from one form to another, as hereinafter described. It consists of a beam, *a*, to the hinder end of which handles *b* are attached, and to the forward end a pole, *c*, with a whiffletree, *d*, in proper place connected therewith. To the under side of the beam I attach two bars, *e e'*, by a single bolt, that passes up through them. Both these bars are jointed at their point of junction with the beam. To these bars one or more short beams, *f*, are attached on each side parallel with the center beam, *a*, the attachment being by a single bolt, so that they can move into the various positions required. By this construction it will be seen that as the outer ends of the bars are moved forward or back the beams *f* are carried to or from the beam *a*, still maintaining their position parallel thereto. When both ends of the bars *e e'* are in a line with each other, as shown in Fig. 1, they are secured in that position by a bar, *g*, that passes over the front ends of the beams, and through which the bolts pass and are secured by a nut on top. On the rear end of the beam another bar, *h*, is placed in the same manner. For greater security and strength the beams *f* have each of them a standard, *i*, framed into it in an inclined position, on which a shovel, *k*, is put. These shovels are shown detached in Fig. 5, and are hereinafter more particularly described.

To cultivate corn or cotten where it is to be hilled and the machine is required to work on both sides of the row at the same time, the center shovel is removed and both ends of the bars are inclined backward, when the straight parallel brace-bars *g* and *h'* (see Fig. 2) are so attached as to hold it in its proper position, the notch in the center of the bar *g* being made to embrace the center beam. A third position that the machine can be placed in is to bring the outer ends of the bars *e* and *e'* forward, as shown in Fig. 3, in which it is fastened by the bars *g* and *h*, as before described. This is for working between the rows of corn, &c., and also serves to hill it.

It will be obvious that the shovels can be made to work close or far apart at pleasure. This is regulated, in the position shown in Fig. 1, by a brace of iron, which extends from the front outer end of bar *e* to the beam *a*, where a bolt passes through it. This brace has several holes in it, into either of which the bolt can go, and thus the frame can be contracted or spread. Each of the standards is properly braced by a rod, *m*, extending up from the top of the shovel to the beam in front.

The two outside shovels are formed as shown in Fig. 5, having a notch, *o*, in their front lower edge, which receives the shank of the point. This point is made to fit over the end of the shovel, and the shank *q*, which is a square bar, passes backward through the notch. This shank is of a curved form, with the convex side upward, so as to rest on its heel. A bolt, *r*, passes down through the shovel and is fastened by a nut under the shank, which, secures all together. The use of the shank to the point is to form a bearing behind to prevent the shovels from entering too deep into the ground.

Having thus fully described my improvements, what I claim therein as new, and desire to secure by Letters Patent, is—

1. The movable and jointed frame for cultivators, constructed and arranged substantially in the manner and for the purpose set forth.

2. In combination with the shovels for cultivators, the point having a shank thereon, for the purposes above set forth.

WILLIAM DYSERT.

Witnesses:
A. P. BROWN,
J. M. THAYER.